(12) United States Patent
Martinez

(10) Patent No.: US 10,959,073 B2
(45) Date of Patent: Mar. 23, 2021

(54) WIRELESS VEHICULAR COMMUNICATIONS ACCORDING TO VEHICULAR COMMUNICATIONS PROTOCOLS USING RESERVATION TIMES

(71) Applicant: NXP B.V., Eindhoven (NL)

(72) Inventor: Vincent Pierre Martinez, Roques (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/451,689

(22) Filed: Jun. 25, 2019

(65) Prior Publication Data

US 2020/0008026 A1    Jan. 2, 2020

(30) Foreign Application Priority Data

Jul. 2, 2018  (EP) .................................... 18305863

(51) Int. Cl.
*H04W 4/46* (2018.01)
*H04W 4/12* (2009.01)
(Continued)

(52) U.S. Cl.
CPC .............. *H04W 4/46* (2018.02); *H04W 4/12* (2013.01); *H04W 84/042* (2013.01); *H04W 84/12* (2013.01); *H04W 84/18* (2013.01)

(58) Field of Classification Search
CPC ....... H04W 4/46; H04W 4/12; H04W 84/042; H04W 84/12; H04W 84/18; H04W 16/14;
(Continued)

(56) References Cited

U.S. PATENT DOCUMENTS

| 2008/0205320 A1* | 8/2008 | Alrabady | H04W 76/40 370/312 |
| 2011/0034201 A1* | 2/2011 | Hamada | H04L 67/12 455/517 |

(Continued)

OTHER PUBLICATIONS

Kapsch Trafficcom AG, "Co-channel coexistence method for ITS-G5 and other technologies", ERMTG37-ITS-G5 LTE V2X coexistence session, Jun. 10, 2018.

*Primary Examiner* — Kwang B Yao
*Assistant Examiner* — Syed M Bokhari

(57) ABSTRACT

Embodiments are directed to methods and apparatuses for wireless vehicular communications using different communications protocols. A method includes communicating wirelessly via first vehicular communications circuitry by using a first vehicular communications protocol in which respective messages are sent synchronously. The method further includes, as part of each transmitted message, including data which is consistent with another vehicular communications protocol in which messages are sent asynchronously on behalf of other vehicular communications circuits and which indicates to the other vehicular communications circuits a reservation time for ensuing message subframes. In some embodiments, in addition to or alternatively to the above, the messages are transmitted based upon a fairness criterion associated with a relative extent of frequency-spectrum use involving transmissions according to the first vehicular communications protocol relative transmissions according to the other vehicular communications protocol.

18 Claims, 6 Drawing Sheets

(51) Int. Cl.
*H04W 84/04* (2009.01)
*H04W 84/12* (2009.01)
*H04W 84/18* (2009.01)

(58) Field of Classification Search
CPC ..... H04W 84/005; H04W 28/26; H04W 4/40; H04L 69/18
USPC ........................................................ 370/312
See application file for complete search history.

(56) References Cited

U.S. PATENT DOCUMENTS

| | | | |
|---|---|---|---|
| 2012/0105637 A1* | 5/2012 | Yousefi | H04N 7/183 |
| | | | 348/148 |
| 2016/0248555 A1 | 8/2016 | Lei et al. | |
| 2017/0188391 A1 | 6/2017 | Rajagopal et al. | |
| 2017/0222913 A1* | 8/2017 | Chia | G08G 1/09675 |
| 2017/0367100 A1 | 12/2017 | Sorrentino et al. | |
| 2018/0014146 A1 | 1/2018 | Gulati et al. | |
| 2019/0044728 A1* | 2/2019 | Karmoose | G08G 1/22 |
| 2019/0306592 A1* | 10/2019 | Pusheck | H04W 4/48 |
| 2020/0077279 A1* | 3/2020 | Foerster | H04W 4/40 |
| 2020/0120458 A1* | 4/2020 | Aldana | H04W 28/22 |

* cited by examiner

WIRELESS VEHICULAR COMMUNICATIONS ACCORDING TO VEHICULAR COMMUNICATIONS PROTOCOLS USING RESERVATION TIMES

CROSS-REFERENCE TO RELATED APPLICATIONS

This application claims the priority under 35 U.S.C. § 119 of European Patent application no. 18305863.5, filed on 2 Jul. 2018, the contents of which are incorporated by reference herein.

OVERVIEW

Aspects of various embodiments are directed to apparatuses and methods for providing wireless vehicular communications according to different vehicular communications protocols using a reservation time.

Vehicle-to-everything (V2X) communications are used to pass information from a vehicle to another entity, and vice versa. As vehicles can be moving, V2X communications can form a vehicular ad-hoc network when two or more V2X devices come within each other's range. V2X communications can be provided using different types of technology which utilize different vehicular communications protocols for providing wireless vehicular communications.

These and other matters have presented challenges to efficiencies of wireless vehicular communications implementations, for a variety of applications.

SUMMARY

Various example embodiments are directed to issues such as those addressed above and/or others which may become apparent from the following disclosure concerning vehicular communication circuitry that provide wireless vehicular communications using different types of vehicular communications protocol.

In certain example embodiments, aspects of the present disclosure involve vehicular communication circuitry that uses a type of vehicular communications protocol that operates in the same bandwidth as another type of vehicular communications protocol, and while minimizing interference between the communications.

According to a first aspect of the present disclosure there is provided a method of wireless vehicular communication that includes communicating wirelessly via first vehicular communications circuitry by using a first vehicular communications protocol in which respective messages are sent synchronously relative to a timing reference. The first vehicular communications circuitry includes data as part of each transmitted message. The data is consistent with another vehicular communications protocol in which respective messages are sent asynchronously on behalf of other vehicular communications circuits and which indicates to the other vehicular communications circuits, a reservation time for ensuing message subframes during which the other vehicular communications circuits are not to transmit.

In one or more embodiments, the method further includes the first vehicular communications circuitry co-existing in wireless communications operation with the other vehicular communications circuits by using a common frequency spectrum over a shared vehicular geography to transmit messages according to the first vehicular communications protocol. The transmitted messages use a preamble to reserve transmission time for the first vehicular communications circuitry and according to the other vehicular communications protocol, to suspend transmissions from the other vehicular communications circuits. The included data may be part of the preamble in accordance with the first vehicular communications protocol. The method can further include the first vehicular communications circuitry limiting transmissions of one or more messages according to a control indication. For example, the method can include the first vehicular communications circuitry accessing a spectrum-sharing fairness indication as a basis for deciding whether to transmit a message.

In one or more embodiments, the method further includes the first vehicular communications circuitry co-existing in wireless communications operation with the other vehicular communications circuits by using a common frequency spectrum, and the first vehicular communications circuitry monitoring broadcasts over the common frequency spectrum to discern a relative extent of spectrum use involving transmissions according to at least one of the first vehicular communications protocol and other vehicular communications protocol.

In one or more embodiments, the method further includes first vehicular communications circuitry transmitting messages based upon a fairness criteria associated with a relative extent of frequency-spectrum use involving transmissions according to the first vehicular communications protocol relative to transmissions according to the other vehicular communications protocol.

For example, the reservation time is indicated by the included data as part of an orthogonal frequency-division multiplexing (OFDM) symbol and is sufficiently long for completing transmission of ensuing message subframes and for other messages, transmitted according to the first vehicular communications protocol, to be sent synchronously relative to completion of transmission of the ensuing message subframes. Any of the above methods can further include the first vehicular communications circuitry transmitting messages based upon the one or more fairness criteria associated with a relative extent of frequency-spectrum use involving transmissions according to the first vehicular communications protocol relative to criteria including transmissions according to the other vehicular communications protocol.

In a number of embodiments, the reservation time indicated by the included data is longer than needed for completing transmission of ensuing message subframes. The first vehicular communications protocol can be protocol consistent with LTE-based or other Third Generation Partnership Project (3GPP)-based communications (e.g., 3GPP cellular V2X), as further described herein, and the other vehicular communications protocol is a protocol consistent with WiFi or IEEE 802.11p communications. In a number of embodiments, the last of the ensuing symbols which form part of the message has a length that is set to accommodate and account for a synchronous reply to the message from another circuit communicating using the first vehicular communications protocol. For example, the first vehicular communications protocol is a protocol consistent with LTE-V2X communications, and wherein the reservation time is greater than one millisecond and sufficiently long to cover ensuing symbols forming part of the message plus at least one half of a preamble of another message and thereby facilitating another circuit to respond without interference from a transmission sent via the other vehicular communications protocol. More specifically, the first vehicular communications protocol is a protocol consistent with LTE-V2X communications, and wherein the reservation time is approximately 1.04 milliseconds. In various embodiments, the first vehicular communications protocol is a protocol consistent with LTE-V2X communications, and wherein the reservation time corresponds to a time that accounts for the ensuing symbols which form part of the message plus an entire preamble of another message, thereby facilitating another circuit to respond without interference from a transmission sent via the other vehicular communications protocol.

In an example, the last of ensuing symbols which form part of the message has a length that is set to accommodate and account for a synchronous reply to the message from another circuit communicating using the first vehicular communications protocol.

According to a second aspect of the present disclosure there is provided an apparatus comprising a first vehicular communications circuitry including at least one communications circuit. The first vehicular communications circuitry including the at least one communications circuit is configured in a vehicle and configured to communicate wirelessly by using a first vehicular communications protocol in which respective messages are sent synchronously relative to a timing reference, and including, data as part of each transmitted message. The data is consistent with another vehicular communications protocol in which respective messages are sent asynchronously on behalf of other vehicular communications circuits, and which indicates to the other vehicular communications circuits, a reservation time for ensuing message subframes during which the other vehicular communications circuits are not to transmit.

According to a third aspect of the present disclosure there is provided a method of wireless vehicular communications. The method includes communicating wirelessly via first vehicular communications circuitry by using a first vehicular communications protocol in which respective messages are sent synchronously relative to a timing reference. The method further includes for each message transmitted according to the first vehicular communications protocol, the first vehicular communications circuitry transmitting the message including data which is consistent with a second vehicular communications protocol in which respective messages are sent asynchronously on behalf of other vehicular communications circuits and also transmitting the message based upon a fairness criterion associated with a relative extent of frequency-spectrum use involving transmissions according to the first vehicular communications protocol relative to transmissions according to the second vehicular communications protocol.

In a number of embodiments, the first vehicular communications circuitry tracks and in response derives an indication of channel usage involving channel congestion based on transmissions in accordance with the first vehicular communications protocol relative to transmissions in accordance with the second vehicular communications protocol, and wherein the first vehicular communications circuitry includes a plurality of similarly-operating circuits operating in respective vehicles. The fairness criteria may be based on an indication of channel usage and channel-busy ratio metrics respectively associated with transmissions in accordance with the first vehicular communications protocol and transmissions in accordance with the second vehicular communications protocol. For example, the fairness criteria may be based on an indication of channel usage and a ratio of channel-busy ratio (CBR) metrics, the ratio of CBR metrics being a function of detected transmissions in accordance with the first vehicular communications protocol and detected transmissions in accordance with the second vehicular communications protocol. In other specific embodiments, wherein the fairness criteria may be based on dynamic indications of CBR metrics, associated with transmissions in accordance with at least the first vehicular communications protocol, wherein the dynamic indications of CBR metrics vary based on channel-usage indications as measured by a given vehicular device operating with the first vehicular communications circuitry and as collectively measured by a plurality of other vehicular devices, each operating with a version of the first vehicular communications circuitry. The first and second vehicular communications protocols are, respectively, protocols consistent with LTE-based or other 3GPP-based communications and with WiFi or 802.11p communications.

In various embodiments, the fairness criterion may be based on dynamic indications of CBR metrics, respectively associated with transmissions in accordance with at least the first vehicular communications protocol, wherein the dynamic indications of CBR metrics vary based at least in part on channel-usage indications received by a given moving vehicular device operating with the first vehicular communications circuitry while the moving vehicular device is communicating with other vehicular devices, each operating with a version of the first vehicular communications circuitry. For example, the fairness criterion may be based on a ratio of dynamic indications of CBR metrics involving measurements by moving vehicular devices while communicating with other vehicular devices, each operating with a version of the first vehicular communications circuitry. Additionally, the fairness criterion may be set temporally based on N different temporal partitioning states, each indicating an extent to which relative channel congestion is due to transmissions in accordance with the first vehicular communications protocol.

In one or more embodiments, each message transmitted according to the first vehicular communications protocol is coded as a set of data symbols, at least one of which is a variable length symbol configured to include data indicative of a channel-usage and to share with other vehicular devices, each operating with a version of the first vehicular communications circuitry. For example, the first vehicular communications protocol is consistent with LTE-based or other 3GPP-based communications, wherein each message transmitted according to the first vehicular communications protocol is coded as a set of orthogonal frequency-division multiplexing (OFDM) data symbols, at least one of which is a variable length symbol configured to include data indicative of channel-usage and to share with other vehicular devices, each operating with a version of the first vehicular communications circuitry. In related and specific embodiments, the first vehicular communications protocol is consistent with LTE-based communications, wherein each message transmitted according to the first vehicular communications protocol is coded as a set of OFDM data symbols and with at least one corresponding to a variable-length demodulation reference signal (DRMS) which indicates a channel-usage state and which is shared with other vehicular devices, each operating with a version of the first vehicular communications circuitry.

According to a fourth aspect of the present disclosure there is provided a vehicular communications apparatus that comprises first vehicular communications circuitry including a communication circuit. The first vehicular communications circuitry including the communication circuit configured to communicate wirelessly by using a first vehicular communications protocol in which respective messages are sent synchronously relative to a timing reference, and for each message transmitted according to the first vehicular communications protocol, transmitting the message including data which is consistent with a second vehicular communications protocol in which respective messages are sent asynchronously on behalf of other vehicular communications circuits, and transmitting the message based upon a fairness criterion associated with a relative extent of frequency-spectrum use involving transmissions according to the first vehicular communications protocol relative to transmissions according to the second vehicular communications protocol. In some specific embodiments, the message can be transmitted based on more than one fairness criterion.

In one or more embodiments, the first vehicular communications circuitry is further configured to include data, as part of a symbol in each transmitted message, which is consistent with the second vehicular communications protocol in which respective messages are sent asynchronously on behalf of other vehicular communications circuits, and which indicates to the other vehicular communications circuits a reservation time for ensuing message subframes during which the other vehicular communications circuits are not to transmit. For example, the first vehicular communications protocol is a protocol consistent with LTE-based or other 3GPP-based (e.g., 5G-new radio (NR)-based) communications, and the second vehicular communications protocol is a protocol consistent with WiFi or 802.11p communications, wherein the first vehicular communications circuitry includes a plurality of similarly-operating circuits operating in respective vehicles.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
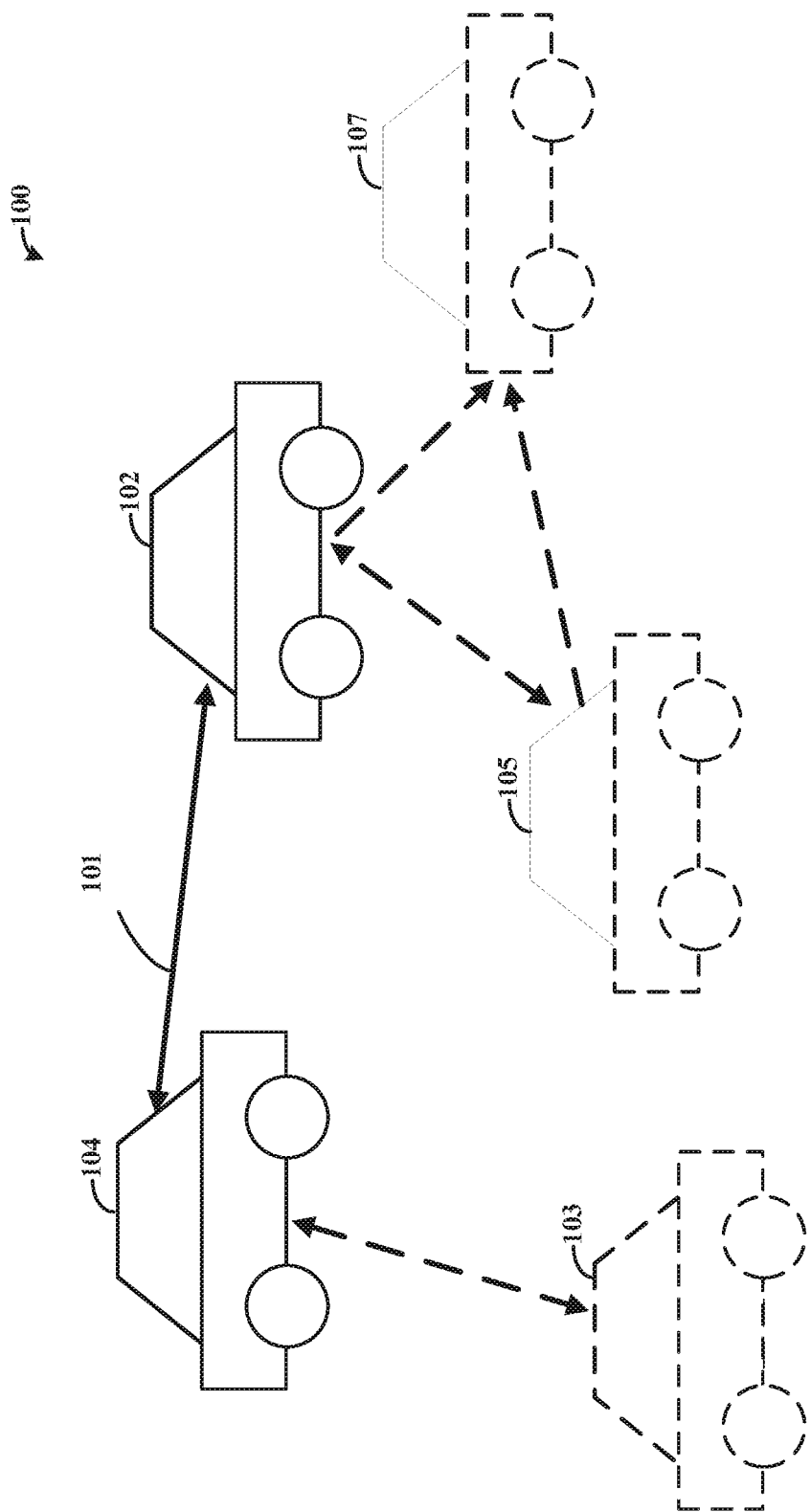
FIG. 1A illustrates an example network, in accordance with various embodiments.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless vehicular communications involving vehicular communications protocols. In certain implementations, aspects of the present disclosure have been shown to be beneficial when used in the context of different technologies that operate using different vehicular communications protocols and coexist in the same portion of bandwidth, and that allows for both technologies to be implemented while mitigating interference between the communications protocols. In some embodiments, circuitry operating the first technology are adapted to include data in transmitted messages that can be interpreted by other circuitry using the second technology and to reserve the channel for a period of time. In other embodiments and/or in addition, the circuitry operating the first technology can transmit messages according to a fairness criterion that is associated with relative frequency spectrum-use of transmissions according to each communications protocol. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Vehicles, such as automobiles, can include communications circuitry for wirelessly communicating with other vehicles and/or circuitry using vehicular communications protocol, sometimes herein referred to as vehicle-to-everything (V2X) communications. Different V2X technologies can co-exist or spectrum share the same bandwidth, such as with WiFi and fourth generation (4G) technologies. With the evolution of different technologies, vehicles in operation, e.g., in the field, may be operating using different technologies that co-exist in the same section of bandwidth, such as a 10 MHz piece of spectrum. As a specific example, WiFi (e.g., IEEE 802.11p) and Third Generation Partnership Project (3GPP) Cellular Vehicle-to-Everything (C-V2X) technologies can be operated by vehicles for transmission of messages between vehicles. Example 3GPP technologies include LTE-based technologies, such as Long Term Evolution Release 14 (LTE Rel-14), Long Term Evolution Release 15 (LTE Rel-15) as well as other technologies, such as Fifth Generation New Radio (5G NR V2X). As both technologies may be used at the same time and in a shared vehicular geographic region, interference between the different radio systems and/or technologies can occur. As used herein, interference refers to or includes the collision of two (or more) messages. In the field, various V2X networks can include a plurality of vehicles, each of which includes at least one first vehicular communication circuit or a second vehicular communication circuit used to transmit messages according to the different vehicular communications protocols. A shared vehicular geographic region or shared vehicular geography includes an overlapping geography of two or more vehicles providing V2X communications, such that the two or more vehicles are within each other's range. In some embodiments, the shared vehicular geographic region may cause formation of one or more vehicular ad-hoc networks.

The different vehicular communications protocols that co-exist in the same bandwidth of the communication channel can operate differently such that providing separation can be burdensome. For example, the first vehicular communications protocol allows for messages to be sent synchronously by circuits relative to a timing reference and multiple messages can be transmitted at the same time. Messages in accordance with the second vehicular communications protocol are sent asynchronously. The second vehicular communications circuitry can observe (e.g., listen) to the channel and communicate in response to the channel being clear (e.g., no messages being transmitted). As vehicles in the field may include both types of technologies, V2X communications using the different technologies that occur within proximity to one another can cause interface as both protocols utilize the same bandwidth. Embodiments in accordance with the present disclosure are directed to techniques for avoiding or mitigating interference between the two technologies that operate in the same bandwidth by performing a temporal separation between communications. The temporal separation can be performed by first vehicular communications circuitry (e.g., 4G or other 3GPP family technologies) adding a preamble to data communications which includes data that is recognized by the second vehicular communications circuitry that use the second vehicular communications protocol. The preamble includes data that reserves the channel for ensuing message subframes on the channel as transmitted by the first vehicular communication circuitry. During the reservation time, the second vehicular communications circuitry do not transmit messages. The preamble is thereby used to suspend transmissions from the second vehicular communications circuits.

As the first vehicular communications circuitry communicates in a synchronized manner, in specific embodiments, each first vehicular communication circuit (in the proximate geographic area) transmits messages having the preamble. The preamble includes data which is consistent with the second vehicular communications protocol, such as data that is part of an orthogonal frequency-division multiplexing (OFDM) data symbol (e.g., a signal field (SIG) OFDM symbol). In specific embodiments, the preamble includes a legacy short training field (L-STF), a legacy long training field (L-LTF) and a SIG OFDM symbol that carries the data recognizable by the second vehicular communications circuitry. The second vehicular communications circuitry recognize the data in the preamble, which reserves transmission time for the first vehicular communications circuitry, and refrains from transmitting messages during the reservation time. The second vehicular communications circuitry may or may not recognize the remaining data transmitted by the first vehicular communications circuitry, but in either embodiment, would not transmit message during the reservation time.

The reservation time can be sufficiently long for completing transmission of the ensuring message subframes and, in a number of embodiments, can be longer than needed for completing the transmission. In specific embodiments, the reservation time can include a length that is set to accommodate and account for a synchronous reply to the message from another circuit that communicates using the first vehicular communications protocol. For example, the reservation time can be long enough for completing transmission of the ensuring message subframes for other messages transmitted in accordance with the first vehicular communications protocol, such as additional time for at least one half of a preamble of another message or an entire preamble of another message. The additional time can allow for or facilitate another first vehicular communication circuit to respond without interference from a transmission sent via the second vehicular communications protocol.

In various embodiments, alternatively and/or in addition to the above, the first vehicular communications circuitry performs temporal separation of the different vehicular communications protocols by monitoring devices communicating in the bandwidth to derive one or more fairness criteria. The fairness criteria indicate, to the first vehicular communications circuitry, a percentage of time to communicate synchronously in accordance with the first vehicular communications protocol and which allows for allocated time for the second vehicular communications circuitry to communicate (e.g., the first vehicular communications circuitry does not communicate during this time). The one or more fairness criteria is associated with a relative extent of frequency-spectrum use involving transmissions according to the first vehicular communications protocol and transmissions according to the second vehicular communications protocol. The one or more fairness criteria can be based on an indication of channel usage and channel-busy ratio (CBR) metrics respectively associated with or being a function of the transmissions in accordance with the first and second vehicular communications protocol. For example, the first vehicular communications circuitry tracks, and in response derives an indication of fairness criteria (e.g., a channel usage based on present technology) involving channel congestion based on the transmissions in accordance with the first vehicular communications protocol and the second vehicular communications protocol. A ratio of CBR metrics of each protocol can be derived and used to determine a fairness criterion as a function of detected transmissions, as further described herein.

In various specific embodiments, the one or more fairness criteria can be dynamically updated over time. The one or more fairness criteria can be based on dynamic indications of CBR metrics or other channel-usage indications, associated with the transmissions in accordance with the respective vehicular communications protocols provided by the first vehicular communications circuitry. As previously described, the first (and second) vehicular communications circuitry can include a plurality of similarly-operating circuit operating in respective vehicles. The first vehicular communications circuits can each measure CBR metrics, a ratio of CBR metrics, and provide the same. The dynamic indications of CBR metrics vary based on the channel-usage indications as measured by a given vehicular device operating as first vehicle communications circuitry and as collectively measured by a plurality of vehicular devices each operating with a first vehicular communication circuit (e.g., a version of the first vehicular communication circuitry). The vehicle may be moving, for example, and while moving is communicating with over vehicles each operating a version of the first vehicle communications circuitry. The one or more fairness criteria are based on a ratio of dynamic CBR metrics involving measurements by moving vehicular devices and that is used to define a percentage of time granted to each communications protocol. One or more of the fairness criteria can be set temporally based on N different temporal partitioning states, each indicating an extent to which communications on the channel are to be for different protocols. The respective state, sometimes herein referred to as a channel-usage state, can be communicated and used to dynamically define the percentage of time.

The CBR metrics, ratio of CBR metrics, and the channel-usage state can be communicated to other first vehicle communications circuits in accordance with various embodiments, and used to dynamically update a fairness criterion. For example, data transmitted according to the first vehicle communications protocol is coded with a set of data symbols, with at least one of the data symbols including a variable length symbol that includes the data indicative of the channel-usage, such as an OFDM data symbol. The at least one data symbol can include a variable length demodulation reference signal (DMRS). The specific length indicates a channel-usage state, according to CBR metrics and/or one or more fairness criteria measured by a first vehicular communications circuit operating in a vehicular device, that is communicated with other vehicular devices operating with a version of a first vehicular communications circuit.

Turning now to the figures, FIG. 1A illustrates an example network, in accordance with various embodiments. As illustrated, the network 100 includes a plurality of vehicles 102, 103, 104, 105, 107, each of which includes at least one of first vehicular communications circuitry or second vehicular communication circuitry used to transmit messages according vehicular communications protocols.

The network 100 includes a V2X network used to provide V2X communications. V2X communications includes four types of communications: vehicle-to-vehicle (V2V), vehicle-to-infrastructure (V2I), vehicle-to-network, (V2N) and vehicle-to-pedestrian (V2P). In specific instances, a V2X network 100 may enable an exchange of information between a plurality of vehicles and, in some instances, other devices. As may be appreciated, as used herein "circuitry" refers to one or more circuits, such as a plurality of similarly-operating (or version of) circuits operating in respective vehicles. The vehicles can communicate messages to one another, such as speed measurements, communication measurements, GPS data, etc., via the communications circuits. Vehicles 102, 103, 104, 105, 107 may use V2V for a variety of use cases, such as emergency electronic brake light, emergency vehicle approaching notification or collision avoidance but not limited thereto, where both parties of the communication have circuitry equipped on different vehicles.

Different vehicles may utilize different technologies for performing the V2X communications that operate using different vehicular communications protocols. For example, a first plurality of vehicles 102, 105, 107 use technology A to communicate according to a first vehicular communications protocol and a second plurality of vehicles 103, 104 use technology B to communicate according to a second vehicular communications protocol. The technology A can include a 3GPP C-V2X technology, such as an LTE-based communication (e.g., LTE REL-14, LTE Rel-15) or a 5 GT NR V2X-based communication.

As the vehicles 102, 103, 104, 105, 107 are not fixed in location, e.g., can move, the first and second vehicular communications protocols co-exist in the same spectral bandwidth and the vehicles operating the different technologies can be within geographic proximity to one another, such that interference (e.g., collision) between the communications can occur. Embodiments in accordance with the present disclosure mitigate and/or avoid such interference by temporal separation of the communications by signaling to technology B devices prior to communication by technology A devices and/or monitoring channel-usage metrics for regulating temporal separations. For ease of reference, vehicular communications circuitry is interchangeably herein referred to as communications circuitry.

As described above, the first and second vehicular communications protocols operated by the first and second communications circuitry exist in the same bandwidth. The first communications circuitry can use technology A. In specific embodiments, technology A is a 4G technology or other 3GPP-type technology, such as 5G-NR. The technology A devices (e.g., vehicles 102, 105, 107) each include a first communications circuit that communicates wirelessly using a first vehicular communications protocol. For example, the first vehicular communications protocol can be consistent with LTE-based communications, such as LTE-V2X communications. The first vehicular communications protocol allows for messages to be sent synchronously by circuits relative to a timing reference. The first communications circuitry can communicate messages as a plurality of message subframes.

3GPP V2X is a synchronous system. All users are assumed to be synchronized on a common reference timing such as Global Navigation Satellite System (GNSS). Use of LTE or other 3GPP obviates the use of synchronization preambles (compared to IEEE 802.11p), which may reduce overhead. As an example, LTE-based communications transmit messages as a set of OFDM data symbols. As 3GPP V2X communications is a synchronous system, a plurality of LTE-based or other 3GPP-based communications can be transmitted at the same time. Additionally, as further described below, transmitting messages without a preamble sequence prefix, the first symbol of each subframe might not be available for channel decoding at the receiver, because it might be used for automatic gain control (AGC) calibration purposes, a phase during which the receiver's transceiver gain is being adjusted to match the required input dynamic expected by the analog to digital converter (ADC).

As may be understood, LTE-based or other 3GPP-based messages can last for one subframe (e.g., 1 ms). From one subframe to the next subframe, there can be a different set of users, therefore a different received power energy. The receiver(s) can adapt their AGC to avoid ADC saturation at each beginning of subframes. In specific embodiments, the first symbol (e.g., the $1^{st}$ OFDM symbol) may not be used for channel decoding at the receiver, as the first symbol may be lost in the AGC calibration. Although AGC calibration routine can lasts for a few μs, in 4G LTE, the OFDM symbol duration can be longer, such as 72 μs. For reference, the AGC settling time in IEEE 802.11p may be less than 8 μs (e.g., 8 μs is the duration of the preamble). Discarding a 72 μs symbol due to ACG calibration purposes in LTE-V2X might be seen a waste of spectrum and time. In accordance with various embodiments, this first symbol is used (e.g., is not wasted) to signal to the technology B devices to not transmit. As this first symbol content would typically not matter, the technology A devices are adapted to use this first symbol to signal to the technology B devices, and using an amplitude that is the same as subsequent symbols of the subframe.

The second communications circuitry can use technology B to communicate between vehicles. In specific embodiments, technology B is a WiFi-based technology, such as IEEE 802.11p. The label 802.11p or WiFi is sometimes used throughout the text referring to when the dot11OCBActivated is set to true enabling communication outside the context of a BSS in IEEE 802.11-2016. The technology B devices (e.g., vehicles 103, 104) each include a second communications circuit that communicates wirelessly using a second vehicular communications protocol with is consistent with WiFi or 802.11p-based communications. The second vehicular communications protocol allows for messages to be sent asynchronously. For example, second communications circuitry can observe (e.g., listen) to the channel and communicate in response to the channel being clear (e.g., no messages being transmitted). As vehicles in the field may include both types of technologies and V2X communications using the different technologies that occur within proximity to one another, communications using both technology can cause collisions as both protocols utilize the same bandwidth. The technology A devices (e.g., vehicles 102, 105, 107) can avoid or mitigate interference by the first communications circuitry adding a preamble to messages communicated and that the second communications circuitry recognizes data 101 in the preamble. More specifically, the data 101 can be added to the first symbol which is not used for data transmission by the first vehicular communications protocol. The preamble provides a reservation time for ensuing message subframes on the channel and in accordance with the second vehicular communications protocol. During the reservation time, the second communications circuitry does not transmit messages, as further described herein. In such a manner, the preamble suspends transmissions from the second communications circuits.

In various specific embodiments, the first communications circuitry can limit transmissions of one or more messages according to a control indication. The control indication may be based on or include a spectrum-sharing fairness indication that is used as a basis for deciding whether to transmit a message. The first communications circuitry can, for example, co-exist in wireless communications operation with the second vehicular communications circuits by using a common frequency spectrum while mitigation or avoiding collisions by monitoring broadcasts over the common frequency spectrum. Based on the monitoring, as further described herein, the first communications circuitry discerns a relative extent of spectrum use involving transmissions according to at least one of the first vehicular communications protocol and second vehicular communications protocol and uses the same to derive the control indication (e.g., the one or more fairness criteria).

Figure 1B:
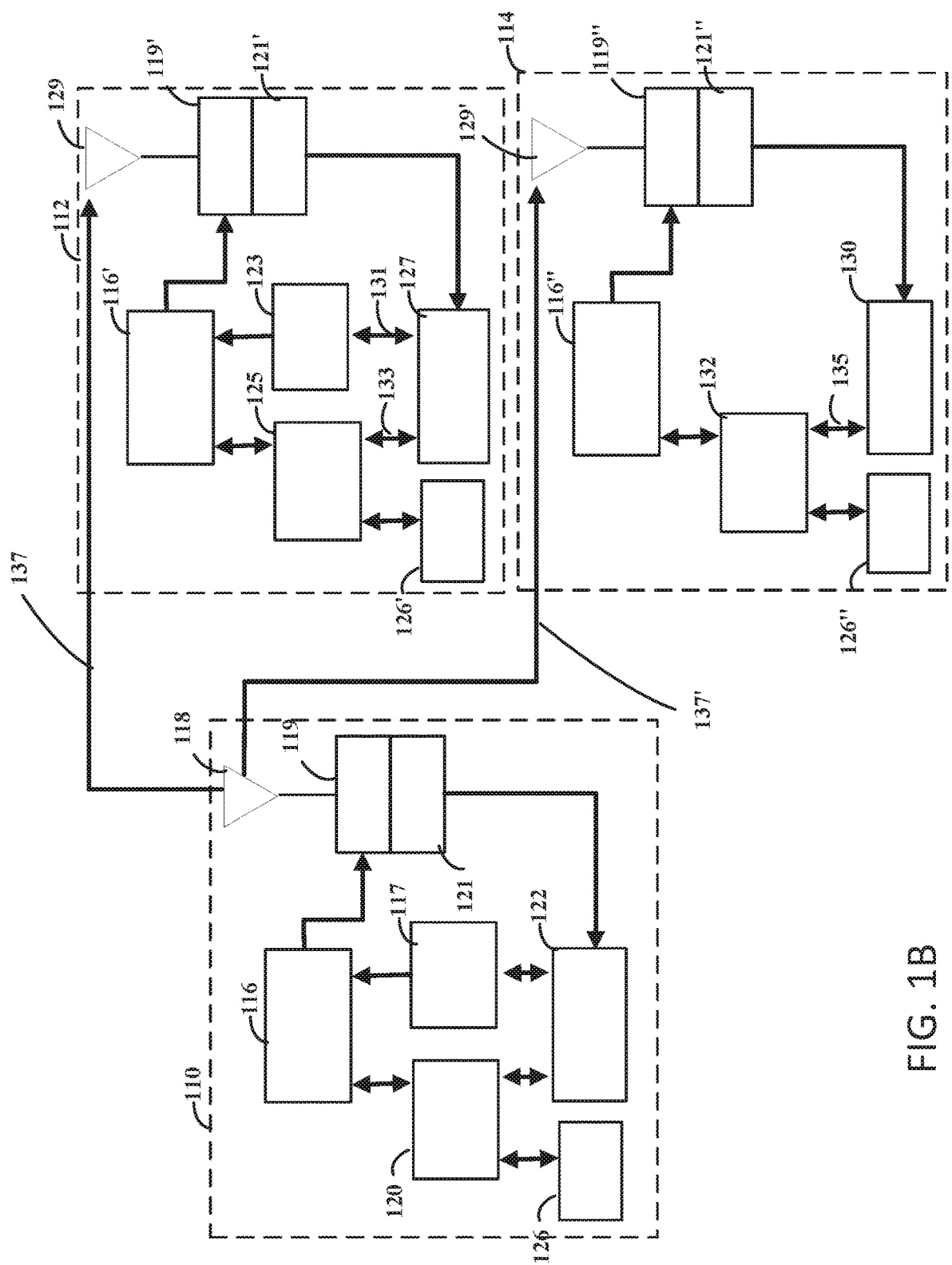
FIG. 1B illustrates example first vehicular communications circuitry and second vehicular communications circuitry, in accordance with various embodiments.

FIG. 1B illustrates example first communications circuitry and second communications circuitry, in accordance with various embodiments. More specifically, FIG. 1B illustrates two first communications circuitries 110, 112 (e.g., two circuits located two different vehicles), and second communication circuitry 114. The first communication circuitry 110 is transmitting data over a channel, which is received by the other first communications circuitry and/or the second communication circuitry 114.

As shown, both the first communications circuitries 110, 112 and the second communication circuitry 114 include common circuitry. For ease of reference, only each of the first communication circuitry 110 components are described, although as may be appreciated, both circuits 110, 112 (as well as the second communications circuitry 114) include similar or identical components. The first communication circuitry 110 includes a transmit (TX) processor 116 and receive (RX) processor 122 used to implement various functionality for transmitting and receiving messages in accordance with the first vehicular communications protocol. As may be understood by one of ordinary skill, the TX processor 116 can map to signal constellations based on various modulation schemes (e.g., binary phase-shift keying, quadrature phase-shift keying, M-phase-shift-keying, etc.). The coded and modulated symbols are mapped to an OFDM subcarrier and used to produce a physical channel carrying a time domain OFDM symbol stream. The stream is provided to the antenna 118 via a transmitter (TX) 119.

The receiver (RX) 121 receives a signal through the antenna 118. Although the embodiments illustrate a single antenna, embodiments are not so limited and can include separate RX and TX antennas and/or different antennas for different streams. The RX 121 recovers data modulated onto the RF carrier and provides the data to the RX processor 122, which may perform spatial processing on the data to recover spatial streams (e.g., an OFDM data symbol stream). The RX processor 122 converts the OFDM data symbol stream from the time-domain to the frequency domain using a Fast Fourier Transform (FFT) and uses the same to recover data and control signals which are provided to the controller/processor 120. The controller/processor 120 processes data received in data messages and can be associated with memory 126 that stores program codes and data.

In various embodiments, the first communications circuitry 110 further includes a CBR estimator circuit 117. The CBR estimator circuit 117, as further described herein, can be used to determine a CBR metric and/or a fairness criterion and which is communicated to other first communication circuits (e.g., circuitry 112).

Similarly to that described above, the second communication circuitry 114 includes a transmit (TX) processor 116" and receive (RX) processor 130 used to implement various functionality for transmitting and receiving messages in accordance with the second vehicular communications protocol, e.g., a WiFi-based communication (e.g., IEEE 802.11p). Data messages are provided by the TX processor 116" to the antenna 129' for wirelessly communicating data via the TX 119". The RX 121" receives a signal through the antenna 129' and provides recovered data to the RX processor 130, similarly to that described above and as would be appreciated by one of ordinary skill. The RX processor 130 converts the data stream to recover the data and provides the same to the controller/processor 132. The controller/processor 132 processes data received in data messages and can be associated with memory 126" that stores program codes and data.

In specific embodiments, the first communications circuitry 110 communicates wirelessly using the first vehicular communications protocol in which messages are sent synchronously relative to a timing reference, e.g., a LTE or other 3GPP-based communication. Each transmitted message 137, 137' by the first communications circuitry 110 (as well as the other first communication circuitry 112) includes data that is consistent with the second vehicular communications protocol. The data is part of a preamble of the data message, and which can be provided in the first symbol of the subframe. The second communications circuitry 114 can recognize/interpret the data in the message 137, 137'. For example, the data in the message 137, 137' indicates a reservation time to the second communications circuitry 114. During the reservation time, the first communications circuitry 110 (and potentially other first communication circuits) transmits message subframe(s) and the second communications circuitry 114 (and other proximate second communication circuits) refrains from transmitting. The data thereby reserves transmission time for the first communication circuitry and suspends transmissions from second communication circuitry for the duration of the reservation time.

As a specific example, the first communications circuitry 110 transmits the message 137, 137' (e.g., WiFi preamble+LTE data+DMRS) which is received by both the second communications circuitry 114 and the other first communication circuitry 112. The message 137, 137' includes the data as part of a preamble that is consistent with the second vehicular communications protocol. The second communications circuitry 114 receives the message 137' including the data via the antenna 129' and RX 121", and the RX processor 130 extracts the data in the preamble and provides the remaining portion of the message 135 to the controller/processor 132 (e.g., a WiFi decoder). The controller/processor 132 may attempt to decode the data in the remaining portion of the message 135, and in some instances, may be unable to as the data is communicated in accordance with the first vehicular communications protocol. As the second communications circuitry 114 is able to extract the data in the preamble, the second communications circuitry 114 refrains from transmitting data during the reservation time encoded in the data.

The other first communications circuitry 112 also receives the message 137 and interprets the data in the message 137. As further described herein, the message includes the preamble consistent with the second vehicular communications protocol, additional data encoded in accordance with the first vehicular communications protocol, and channel-usage indication or channel-usage state (e.g., communicated as a DMRS). The channel-usage indication or channel-usage state is used to monitor devices communicating in the bandwidth to dynamically derive a fairness criterion, as further illustrated herein. The transmitted message is received by the antenna 129 and RX 121' of the other first communications circuit 112 and provided to the RX processor 127. The RX processor 127 extracts the data components (e.g., LTE data 133) and the channel-usage data or state (e.g., DMRS 131). The RX processor 127 provides the data component (e.g., LTE data 133) to the controller/processor 125 (e.g., to the LTE data decoder), and the channel-usage indication or state (e.g., DMRS 131), to the CBR estimator circuitry 123, for further processing as described herein. Although the embodiment of FIG. 1B illustrates the CBR estimator circuitry 123 as being separate from the controller/processor 125, embodiments are not so limited and the CBR estimator circuitry 123 can be component of the controller/processor 125.

The first communications circuitry 110 can be part of an apparatus that includes the first vehicular communications circuitry including at least one communications circuit (e.g., various circuits are further described below). As described above, the first communications circuitry 110 including the at least one communications circuit is configured in a vehicle and configured to communicate wirelessly by using a first vehicular communications protocol in which respective messages are sent synchronously relative to a timing reference, and including, as part of each transmitted message, data which is consistent with another vehicular communications protocol in which respective messages are sent asynchronously on behalf of other vehicular communications circuits and which indicates to the other vehicular communications circuits a reservation time for ensuing message subframes during which the other vehicular communications circuits are not to transmit.

In various specific embodiments, the first communications circuitry 110 communicates wirelessly using the first vehicular communications protocol by, for each message transmitted according to the first vehicular communications protocol, transmitting the message including data which is consistent with a second vehicular communications protocol in which respective messages are sent asynchronously on behalf of other vehicular communications circuits, and transmitting the message based upon a fairness criterion associated with a relative extent of frequency-spectrum use involving transmissions according to the first vehicular communications protocol relative to transmissions according to the second vehicular communications protocol. In one or more embodiments, the vehicular communications circuitry is further configured to include the data, as part of a symbol in each transmitted message, which is consistent with the second vehicular communications protocol in which respective messages are sent asynchronously on behalf of other vehicular communications circuits, and which indicates to the other vehicular communications circuits a reservation time for ensuing message subframes during which the other vehicular communications circuits are not to transmit. For example, the first vehicular communications protocol is a protocol consistent with LTE or 5G-NR-based communications, and the second vehicular communications protocol is a protocol consistent with WiFi or 802.11p communications, wherein the first vehicular communications circuitry includes a plurality of similarly-operating circuits operating in respective vehicles.

Figure 2A:
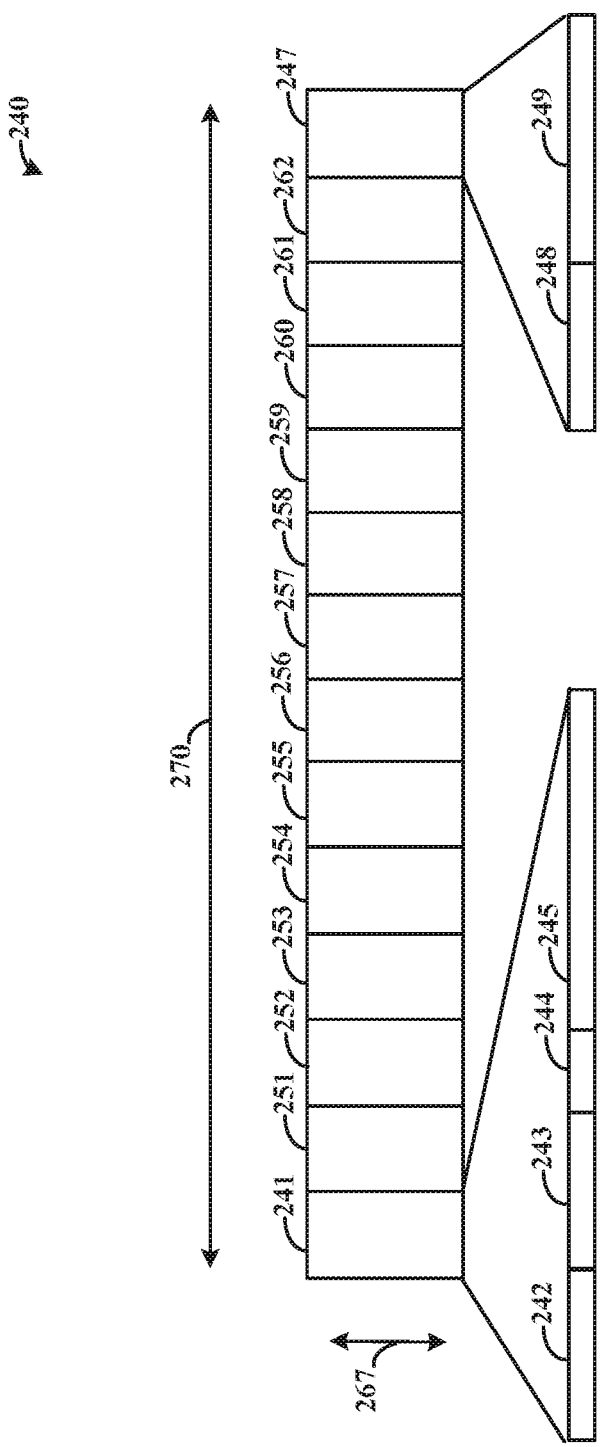
FIGS. 2A-2B illustrate example data communicated by an apparatus, in accordance with the present disclosure.
Figure 2B:
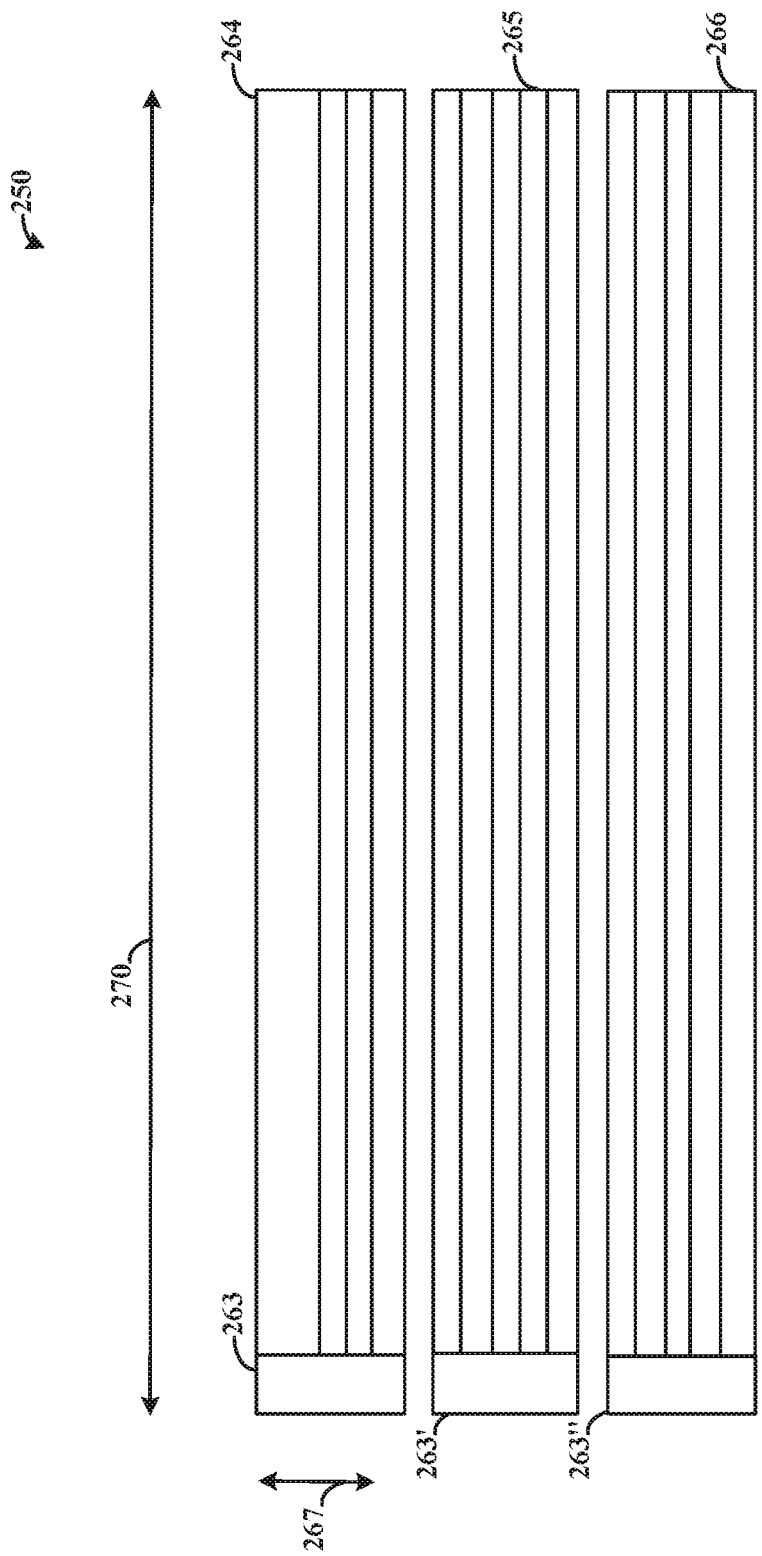

FIGS. 2A-2B illustrate example of a data message communicated by an apparatus, in accordance with the present disclosure. As illustrated by FIG. 2A, the data message 240 is wirelessly communicated by first communications circuitry using a first vehicular communications protocol. As previously described, the data messages in accordance with the first vehicular communications protocol can occur for one subframe and can include an adapted first symbol, e.g., first OFDM symbol 241, having data 244 that can be read and understood by second communications circuitry. The data 244 can indicate a reservation time to the second communications circuitry during which time the first communications circuitry communicates ensuing message subframe(s) and the second communications circuitry does not transmit.

The data message 240 can include a Sidelink data subframe. Sidelink refers to direct communication between two or more nearby devices, also known as PC5, and sometimes denoted LTE-direct, using E-UTRA technology but not traversing any network node. Uplink may represent the action of sending a communication from a device to a network base-station. The principles described herein for the Sidelink data subframe may also be used for Uplink data subframes. The Sidelink data subframe may represent fourteen OFDM symbols (delivered over the time 270 and within the frequency 267). The fourteen OFDM symbols may be transmitted in 1ms time blocks, known as a subframe in LTE terminology, but embodiments are not limited thereto. A data subframe may be made up of more or less symbols and be transmitted in a smaller or larger time block in another application.

The Sidelink data subframe may be broken into two 0.5 ms slots. A first 0.5 ms slot may include seven symbols, and a second 0.5 ms slot may include another seven symbols. A first symbol 241 in the Sidelink data subframe may be used for AGC. The transmitted Sidelink data subframe may include a physical Sidelink shared data channel (PSSCH) and a physical Sidelink control channel (PSCCH), which are both transmitted during the same symbol indexes (0, 1, 3, 4, 6, 7, 9, 10, 12) although on a different set of subcarriers. Separating pairs of the PSSCH and PSCCH symbols (e.g., data at symbols 251, 253, 254, 256, 257, 259, 260, 262) are DMRS (demodulation reference signal symbols) (e.g., DMRS at symbols 252, 255, 258, 261), which are also transmitted by the UE, and also on the same set of subcarriers are the PSSCH and PSCCH. The DMRS are carrying a known pattern for the receiver to perform channel estimation. More specifically, the data message 240 includes fourteen symbols, with one data block at each symbol 241, 251, 252, 253, 254, 255, 256, 257, 258, 259, 260, 261, 262, 247 (symbol 0-13), resulting the illustrated fourteen data blocks.

As illustrated, the first OFDM symbol 241 is modified to hold a preamble that is in accordance with the second vehicular communications protocol (e.g., WiFi-based protocol and which can be 72 usec in some embodiments). The preamble includes various data 242, 243, 244, 245. For example, the preamble includes a legacy short training field (L-STF) 242 that provides support of synchronization and AGC calibration (e.g., which can be 16 usec), a legacy long training field (L-LTF) 243 that provides channel estimation pilot for decoding subsequent WiFi-based symbols (e.g., 802.11p OFDM symbols and which can be 16 usec), and the data 244 that indicates the reservation time (e.g., which can be 8 usec). The data 244, more specifically, includes a SIG OFDM symbol that conveys the MCS and the reservation time. The preamble additionally includes padding 245 which can include white noise and/or another data symbol.

With this preamble, the first communications circuitry reserves the channel for communications in accordance with the first vehicular communications protocol (e.g., for LTE-V2X purposes). As described above, the reservation time can be indicated by the included data as part of an OFDM symbol, such as a SIG OFDM symbol that allows for the reservation of the channel to be performed seamlessly by indicating in the SIG of this header. The second communications circuitry can decode the data in preamble and refrain from sending messages during the indicated reservation time.

The reservation time, as further illustrated herein, can be sufficiently long for completing transmission of the ensuring message subframe, and, optionally, for at least a part of another message. The reservation time being longer than needed for completing the transmission of the ensuring message subframe can facilitate another message to be sent according to the first vehicular communications protocol and without interference by the second vehicular communications protocol. The other message can be transmitted according to the first vehicular communications protocol and sent synchronously relative to completion of the ensuing message subframe. This can accommodate for a synchronously reply to the message from another circuit communicating using the first vehicular communications protocol. In specific embodiments, a data message formed of one subframe can be communicated by the first communications circuitry in or around one millisecond (ms) and the reservation time is greater than one ms and sufficient long to cover the ensuing symbols forming the message plus at least half of a preamble of another message. As described above, the first communications circuitry (e.g., LTE-V2X circuits) are then allowed to send their messages during the reservation time. In specific embodiments, the first communications circuitry refrains from sending in the reserved time slot.

As shown in FIG. 2A, the last symbol 247 in the Sidelink data subframe is a gap or blank symbol, not transmitted by the transmitter (as per LTE V2X specification). This gap or blank symbol 249 may be used to allow some time for a transmitter to receive (TX-to-RX) turnaround. In some specific embodiments, the reservation time is exactly or approximately 1.04 ms. This can correspond to the time for transmitting one full subframe plus the potential next preamble of the next subframe according to the first vehicular communications protocol. Having the reservation time be longer than the ensuing message subframe can mitigate or prevent collision caused by the second communications circuitry due to the last symbol 247 of the data message 240 having the gap or blank symbol 249. For example, during the time of the gap or blank symbol 249, the channel appears clear to the second communications circuitry (e.g., 802.11p users) and the second communications circuitry may attempt to send messages. In some instances, the first communications circuitry intends to have another synchronized message and the second communications circuitry (e.g., 802.11p users) sending the message in response to the gap or blank symbol 249 in the last symbol 247 can lead to collisions for the next subframe in accordance with the first communications protocol. The additional time can facilitate additional messages sent via the first vehicular communications protocol, such as responses to the previously transmitted message, from having interference (e.g., collision) with a transmission sent via the second vehicular communications protocol. As further described herein, in some embodiments, at least a portion 248 of the last symbol includes a DMRS.

FIG. 2B illustrates an example of a subframe for first vehicular communications circuitry. As illustrated, the preamble 263, 263', 263" is sent by all first vehicular communications circuits. In some instances, receivers of the messages 250, such as second communications circuitry, may receive a plurality of the same message (e.g., the preambles 263, 263', 263"). As the same message (e.g., preamble) is received, the second communications circuitry can decode the data in the preamble. The preamble may span the entire bandwidth, such as the entire 8.125 MHz bandwidth, while the rest of the subframe can follow for the first vehicular communications protocol (e.g., LTE-V2X) frequency allocation. For example, each message includes data 264, 265, 266 in a different frequency (within the frequency bandwidth 267 and over time 270), and the remaining frequency bands (illustrated by the boxes) are empty.

Figure 3:
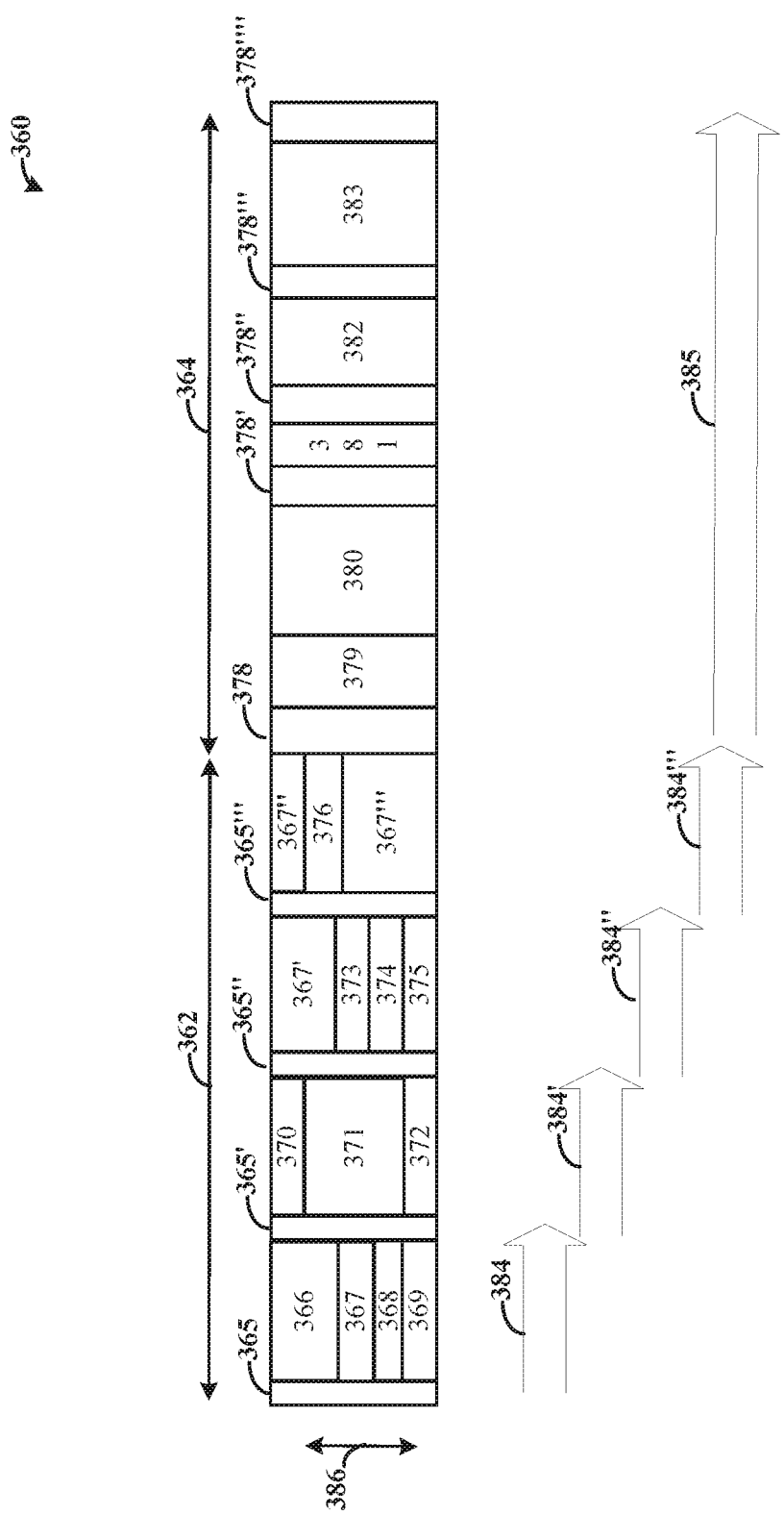
FIG. 3 illustrates an example timing diagram for communication by first vehicular communications circuitry and second vehicular communications circuitry, in accordance with various embodiments.

FIG. 3 illustrates an example timing diagram for data communications by first communications circuitry and second communications circuitry, in accordance with various embodiments. As illustrated by the timing diagram 360, different first communications circuits can communicate within each reservation time and the first communications circuitry can reserve a plurality of reservation times. Each message in accordance with the first vehicular communications protocol can last for one ms, and for a fraction of the frequency direction band (e.g., frequency 386), which allows for multiple messages to be communicated at one time. The second communications circuitry, by contrast, allows for one circuit to communicate at a time and using the whole band. Additionally, the second communications circuitry communicate for variable amounts of time.

As further illustrated herein, the time allotted for each communications protocol (e.g., LTE time 362 and 802.11p time 364) can be in accordance with one or more fairness criteria which can be dynamically updated overtime. A fairness criterion is determined based on a level of channel congestion as allocated between the communications protocols, and can dynamically shift depending on technology use (e.g., with LTE off time 385 based on the fairness criterion). Various embodiments can include one or more fairness criteria, such as a set of fairness criteria that is dynamically updated overtime. FIG. 3 illustrates an example of a 50:50 allocation, although embodiments are not so limited. For example, different LTE users communication at the same and different times (e.g., LTE messages 366, 368, 369, 370, 371, 372, 373, 374, 375, 376) and with empty frequency spaces 367, 367', 367", 367'". Each LTE message includes a preamble 365, 365', 365", 365'" in the first symbol that reserves time 384, 384', 384", 384'". Different 802.11p users each communicate at different times using the entire frequency (e.g., 802.11p messages 379, 380, 381, 382, 383) with empty frequency space between 378, 378', 378", 378'", 378"".

For example, the above-described first communications circuitry can, for each message transmitted according to the first vehicular communications protocol (and that includes the data which is consistent with the second vehicular communications protocol), transmit the message based upon the fairness criterion. The fairness criterion (or criteria) is associated with a relative extent of the frequency spectrum use involving transmissions according to the first vehicular communications protocol and transmissions according to the second vehicular communications protocol. The first communications circuitry can include a plurality of similarly operating circuits operating in vehicles. Each of the first communications circuits can track transmissions in accordance with the first vehicular communications protocol and the second vehicular communications protocol, and therefrom derives an indications of fair channel usage involving channel congestion based on the transmissions.

The one or more fairness criteria can be based on an indication of channel usage and CBR metrics associated with the transmissions. As described in detail herein, the processing circuitry (e.g., via the CBR estimator circuitry) of the first communications circuitry derives the CBR metrics which is based on channel usage (e.g., usage of the channel by devices utilizing particular technology), such as based on a function of the detected transmissions in accordance with each of the first and second vehicular communications protocols. Additionally, the CBR metrics are dynamically updated using dynamic indications of channel-usage. For example, each of the plurality of first communications circuits can track channel-usage involving channel congestion and provide channel-usage indications (based on the metrics) which may vary as measured by a given vehicular device. The devices may be moving and thus the channel-usage can change depending on vehicles in the area and the particular communications circuitry. The CBR metrics and channel-usage indications involve measurements by the moving vehicular devices and, optionally, while communicating with other vehicular devices. The dynamic indication of CBR metrics are based on channel-usage indications of the given vehicular device and as collectively measured by a plurality of vehicular devices, each operating a version of the first vehicular communications circuitry.

Using the specific example of devices using LTE and WiFi-based communications, herein referred to as LTE-V2X users and WiFi users, the CBR metrics is measured and computed by the first communications circuitry (e.g., the LTE-V2X users). The CBR metrics provides an indication of the level of channel congestion, and is defined as the amount of subchannels in the previous subframes that experience an average relative received signal strength (RSSI) higher than a preconfigured threshold, such as the previous 100 subframes. One form of the CBR metric is designed for a channel in which there are only LTE-V2X users. This can be modified, assuming that the first communications circuitry (e.g., the LTE-V2X users) can read preambles in accordance with the second vehicular communications protocol (e.g., 802.11p preambles), thus distinguishing CBR metrics from WiFi users and CBR metrics from LTE-users. For a specific example, using LTE-V2X and WiFi based communications, the following can be defined:

$CBR_{LTE_{self}}$ is defined as CBR coming from usage of the channel by LTE users, as measured by a given LTE-V2X user $CBR_{LTE_{others}}$ is defined as CBR coming from usage of the channel by LTE users, as measured by all the other LTE-V2X users $CBR_{ITSG5}$ is defined as CBR coming from usage of the channel by WiFi users, Thus resulting in a ratio of the CBR metrics:

$$Tech_{ratio} = \frac{CBR_{LTE_{self}} * 0.5 + CBR_{LTE_{others}} * 0.5}{CBR_{ITSG5}}.$$

This ratio can be used to dynamically define the percentage of time granted to the different technology users, e.g., the 802.11p users and the LTE users, which can include the fairness criterion. As the ratio is based on usage, the amount of time is adjusted based on technology being used in the field and in real time.

In some embodiments, the fairness criterion is set temporally based on N different temporal partitioning channel-usage states. Each state indicates an extent to which the relative channel congestion is due to transmissions in the first (or second) vehicular communications protocol. As a specific example, and using the above, a granularity of 1/N for the $Tech_{ratio}$ can be used, thus N different dynamic temporal partitioning states. The specific example used N=4, but other values can be chosen such as N=8, N=10. Using the example of N=4, the following channel-usage states can be used:

|  | Tech_ratio | Number of LTE-V2X subframes | Number of 802.11p subframes |
| --- | --- | --- | --- |
| state 1 | 25% | 3 over 4 | 1 over 4 |
| state 2 | 50% | 2 over 4 | 2 over 4 |
| state 3 | 75% | 1 over 4 | 3 over 4 |
| state 4 | 100% | 0 over 4 | 4 over 4 |

However, the above table is provided for illustrative purposes only, and embodiments are not so limited. The above described states can be communicated by the first vehicular communications circuitry.

Figure 4:
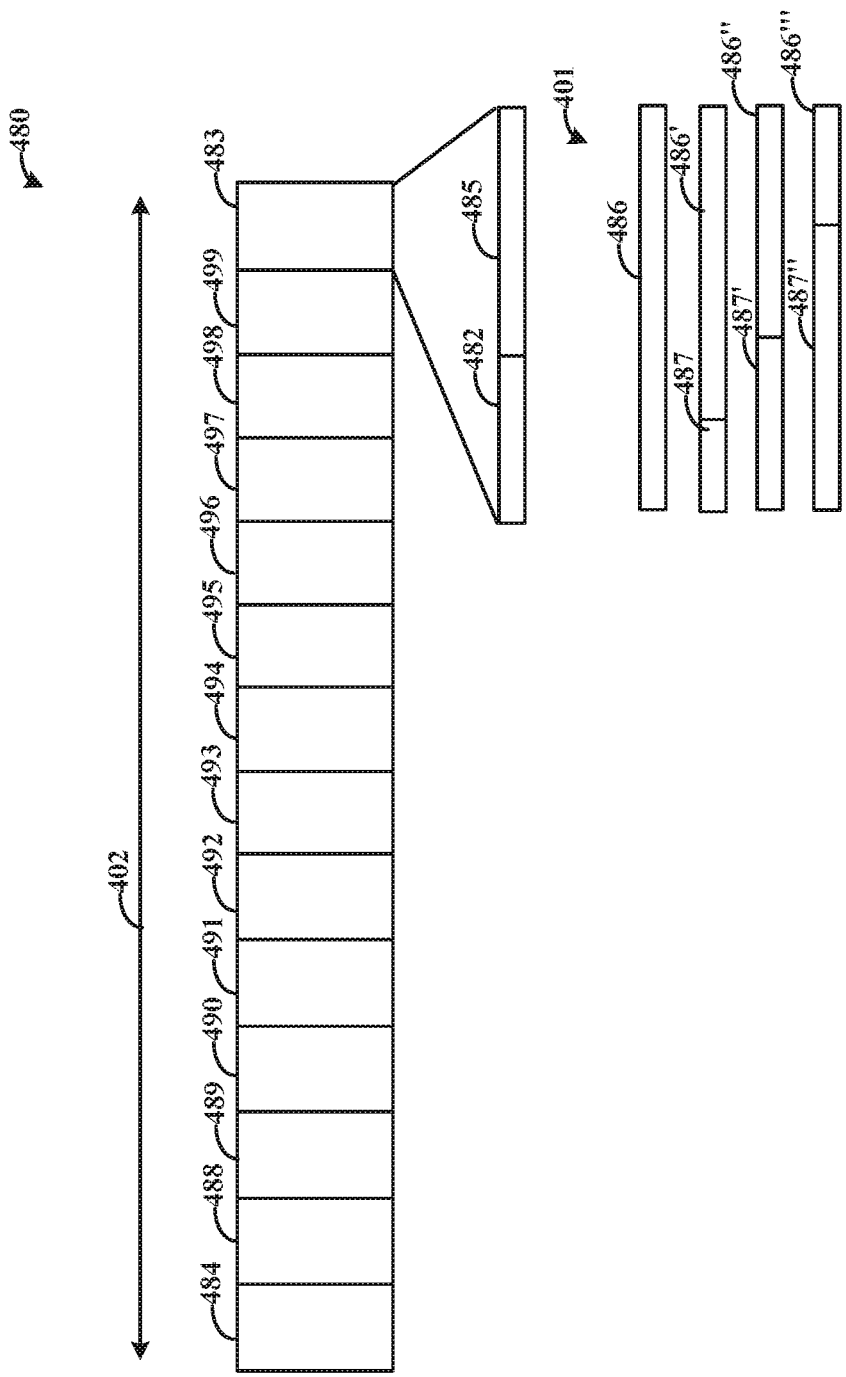
FIG. 4 illustrates example data communicated by an apparatus, in accordance with the present disclosure.

FIG. 4 illustrates example data communicated by first communications circuitry, in accordance with the present disclosure. As previously described, the first vehicular communications protocol is encoded as a set of data symbols and at least one of which is a variable length symbol 482 that includes data indicative of the channel-usage (e.g., the above noted CBR metric, state, or other indications of channel-usage), and which is shared with other vehicular devices (over time 402), each operating a version of the first communications circuitry. For example, the first vehicular communications protocol is consistent with an LTE-based or other 3GPP-based communication in which each message transmitted is coded as a set of OFDM data symbols. The at least one variable length symbol 482 can be part of the last OFDM symbol 483 of the message and can include a DRMS which indicates the channel-usage state. Additionally, as previously described, in various embodiments, the first data symbol 484 includes the preamble having data in accordance with the second vehicular communications protocol. Although embodiments are not so limited, as further described herein.

Similarly to FIG. 2A, the data message 480 includes fourteen symbols, with one data block at each symbol 484, 488, 489, 490, 491, 492, 493, 494, 495, 496, 497, 498, 499, and 483 (symbol 0-13), resulting the illustrated fourteen data blocks. The fourteen symbols include data and DMRS, as well as the first symbol and last symbol. Separating pairs of the PSSCH and PSCCH symbols (e.g., data at symbols 488, 490, 491, 493, 494, 496, 497, 499) are DMRS (demodulation reference signal symbols) (e.g., DMRS at symbols 489, 492, 495, 498).

The purpose of the variable length symbol 482, e.g., the extra variable-length DMRS having the variable length empty space 485, is to form signaling from one first vehicular communications protocol device to another. The information that is transmitted can be the computed channel-usage state. Using the above provided example, the computed channel-usage state becomes the $CBR_{LTE_{others}}$ for other LTE-V2X users. In order to do so, a simple yet efficient scheme is used, where the measured $CBR_{LTE_{self}}$ is instructed by a variable length DMRS (e.g., the variable length DMRS 487, 487' 487'' and variable length empty spaces 486, 486' 486'', 486''' that indicate different states 401). The target receiver (e.g., LTE-V2X) can scan for energy in this area, and therefore understand the overall aggregated state number as understood by other devices.

The above-describe embodiments include apparatuses and methods for temporally separating two different technologies that communicate using different communications protocols that exist in the same spectral bandwidth. In specific embodiments, only first communications circuitry is adapted and which allows for the first communications circuitry to be temporally separated with minimal signally between second communications circuitry and the first communications circuitry. In specific embodiments, the signally between consist of the already defined preamble, which may be defined by an existing standard (e.g., IEEE standard). The first communications circuitry is adapted to have the capability detect such a preamble, like a normal WiFi solution and without necessarily having the ability to decode the data (e.g., SIG and the data symbols) of the WiFi protocol.

In accordance with specific embodiments, an 802.11p or other WiFi-type preamble is introduced into the header of the first OFDM symbol of the LTE-V2X messages and which is used for signaling the LTE-V2X group of devices to the ITS-G5 group of devices. A modified CBR metric is introduced to the LTE-V2X devices to dynamically sense the percentage of users pertaining to each technology. And, a variable length DMRS is introduced to the last OFDM signal of the LTE-V2X messages and used for signally each LTE-V2X devices to other LTE-V2X devices. In such embodiments, no modifications are made to the 802.11p devices.

As described above, a number of embodiments are directed to deriving and using one or more fairness criteria, such as a set of fairness criteria that is dynamically updated overtime. In some specific embodiments, one (or more) of the fairness criterion can be related to an importance or priority of a message or types of messages, such as a control override instruction and/or emergency message. As used herein, criteria can refer to a singular criterion or a plurality of criteria, such as one or more criteria.

Various embodiments in accordance with the present disclosure include variations to the specific embodiments described above. For example, the preamble can be included in the last symbol of the previous message subframe. Other embodiments are not limited to use of the preamble. For example, the first communications circuitry can reserve the time by sending separate messages (not a preamble), which signals to the second communications circuitry that the channel is busy. The first communications circuitry then provides the synchronized signal at the end of the message. In other embodiments, the separate message can include a message in accordance with the second vehicular communications protocol and which reserves the time. For example, the first communication circuitry can be adapted to send messages (e.g., short messages) in accordance with the second vehicular communications protocol and that reserves time for subsequent transmission of messages according to the first vehicular communications protocol.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 117 and 120 of FIG. 1B depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIG. 1B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "a first communications circuit" and "another first communications circuit," the adjectives "a" and "other" are not used to connote any description of the structure or to provide any substantive meaning; rather, such adjectives are merely used for English-language antecedence to differentiate one such similarly-named structure from another similarly-named structure (e.g., "first circuit that communicates according to a first vehicular communications protocol . . . " is interpreted as "circuit that communicates according to a first vehicular communications protocol . . . "). By contrast, "a first communications circuit" and a "a second communications circuit" is used to connote substantive meaning in that the first communications circuit communicates according to a first vehicular communications protocol and the second communications circuit communicates according a different (e.g., second) vehicular communications protocol.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the first vehicular communications circuitry can adapt its messages to include the preamble and the variable length DMRS as shown by FIG. 2A. As another example, the first vehicular communications circuitry can adapt its messages to include variable length DMRS (and not the preamble) or to include the preamble (and not the variable length DMRS). Such modifications do not depart from the true spirit and scope of various aspects of the disclosure, including aspects set forth in the claims.

LIST OF REFERENCE SIGNALS 100 network
101 data with technology B preamble
102, 105, 107 technology A device
103, 104 technology B device
110, 112 first vehicular communications circuitry
114 second vehicular communications circuitry
116, 116', 116" TX processor
117, 123 CBR estimator
118, 129, 129' antenna
119, 119', 119" TX
120, 125, 132 controller/processor
121, 121', 121" RX
122, 127, 130 RX processor
126, 126', 126" memory
131 DMRS
133 LTE data
135 LTE data+DMRS
137, 137' data message (WiFi preamble+LTE data+DMRS)
240 data message
241 first symbol
242 L-STF
243 L-LTF
244 data that includes the reservation time
245 padding
247 last symbol
248 DMRS of variable length
249 gap or blank symbol of variable length
251, 253, 254, 256, 257, 259, 260, 262 data
252, 255, 258, 261 DMRS
250 data message as sent by a plurality of LTE users
263, 263', 263" 802.11p preamble
264 LTE user 1 message
265 LTE user 2 message
266 LTE user 3 message
267 frequency
270 time
360 timing diagram
362 LTE time
364 802.11p time
365, 365', 365", 365'" preamble
366 LTE user 1 message
367, 367', 367", 367'" empty LTE frequency space
368 LTE user 2 message
369 LTE user 3 message
370 LTE user 4 message
371 LTE user 5 message
372 LTE user 6 message
373 LTE user 7 message
374 LTE user 8 message
375 LTE user 9 message
376 LTE user 10 message
378, 378', 378", 378'", 378"" empty 802.11p frequency space, e.g., symbols
379 802.11p user 1 message
380 802.11p user 2 message
381 802.11p user 3 message
382 802.11p user 4 message
383 802.11p user 5 message
384, 384', 384", 384'"LTE reservation time 1.04 ms
385 LTE off time and open for 802.11p
386 frequency
480 data message
482 variable length symbol, e.g., DMRS
483 last OFDM symbol
484 first data symbol including preamble
485 variable length empty space
486, 486', 486", 486'" empty space
487, 487' 487" variable length DMRS
488, 490, 491, 493, 494, 496, 497, 499 data
489, 492, 495, 498 DMRS
401 states
402 time

What is claimed is:

1. A method of wireless vehicular communication, the method comprising:
communicating wirelessly via first vehicular communications circuitry by using a first vehicular communications protocol in which respective messages are sent synchronously relative to a timing reference; and
as part of each transmitted message, the first vehicular communications circuitry including data which is consistent with another vehicular communications protocol in which respective messages are sent asynchronously on behalf of other vehicular communications circuits and which indicates to the other vehicular communications circuits a reservation time for ensuing message subframes during which the other vehicular communications circuits are not to transmit, the first vehicular communications circuitry co-existing in wireless communications operation with the other vehicular communications circuits by using a common frequency spectrum over a shared vehicular geography by transmitting messages according to the first vehicular communications protocol, which uses a preamble including the data to reserve transmission time for the first vehicular communications circuitry and according to the other vehicular communications protocol, to suspend transmissions from the other vehicular communications circuits.

2. The method of claim 1, wherein the included data is part of a preamble in accordance with the first vehicular communications protocol.

3. The method of claim 1, further including the first vehicular communications circuitry limiting transmissions of one or more messages according to a control indication.

4. The method of claim 1, further including the first vehicular communications circuitry accessing a spectrum-sharing fairness indication as a basis for deciding whether to transmit a message.

5. The method of claim 1, further including the first vehicular communications circuitry co-existing in wireless communications operation with the other vehicular communications circuits by using a common frequency spectrum, and the first vehicular communications circuitry monitoring broadcasts over the common frequency spectrum to discern a relative extent of spectrum use involving transmissions according to at least one of the first and other vehicular communications protocols.

6. The method of claim 1, further including the first vehicular communications circuitry transmitting messages based upon a fairness criteria associated with a relative extent of frequency-spectrum use involving transmissions according to the first vehicular communications protocol relative to transmissions according to the other vehicular communications protocol.

7. The method of claim 1, wherein the reservation time is indicated by the included data as part of an OFDM symbol and is sufficiently long for completing transmission of ensuing message subframes and for other messages, transmitted according the first vehicular communications protocol, to be sent synchronously relative to completion of transmission of the ensuing message subframes.

8. The method of claim 1, wherein the reservation time indicated by the included data is longer than needed for completing transmission of ensuing message subframes.

9. The method of claim 1, wherein the first vehicular communications protocol is a protocol consistent with LTE-based communications, and the other vehicular communications protocol is a protocol consistent with WiFi or 802.11p communications.

10. The method of claim 1, wherein the first vehicular communications protocol is a protocol consistent with LTE-V2X communications, and wherein the reservation time is greater than one millisecond and sufficiently long to cover ensuing symbols forming part of the message plus at least one half of a preamble of another message and thereby facilitating another circuit to respond without interference from a transmission sent via the other vehicular communications protocol.

11. The method of claim 1, wherein the first vehicular communications protocol is a protocol consistent with LTE-V2X communications, and wherein the reservation time is approximately 1.04 milliseconds.

12. The method of claim 1, wherein the first vehicular communications protocol is a protocol consistent with LTE-V2X communications, and wherein the reservation time corresponds to a time that accounts for ensuing symbols which form part of the message plus an entire preamble of another message and thereby facilitating another circuit to respond without interference from a transmission sent via the other vehicular communications protocol.

13. The method of claim 12, wherein the last of ensuing symbols which form part of the message has a length that is set to accommodate and account for a synchronous reply to the message from another circuit communicating using the first vehicular communications protocol.

14. A vehicular communications apparatus comprising:
first vehicular communications circuitry including at least one communications circuit configured in a vehicle and configured to communicate wirelessly by:
using a first vehicular communications protocol in which respective messages are sent synchronously relative to a timing reference, and
including, as part of each transmitted message, data which is consistent with a second vehicular communications protocol in which respective messages are sent asynchronously on behalf of other vehicular communications circuits and which indicates to the other vehicular communications circuits a reservation time for ensuing message subframes during which the other vehicular communications circuits are not to transmit;
wherein the first vehicular communications circuitry is further configured to discern a relative extent of spectrum use involving transmissions based on at least one of the first vehicular communications protocol and the second vehicular communications protocol.

15. The vehicular communications apparatus of claim 14, wherein the included data is part of a preamble in accordance with the first vehicular communications protocol.

16. The vehicular communications apparatus of claim 14, wherein the first vehicular communications circuitry is further configured to limit transmissions of one or more messages based on a control indication.

17. The vehicular communications apparatus of claim 14, wherein the first vehicular communications circuitry is further configured to determine whether to transmit a message based on a spectrum-sharing fairness indication.

18. The vehicular communications apparatus of claim 14, wherein the first vehicular communications protocol is a protocol consistent with LTE-based communications, and the second vehicular communications protocol is a protocol consistent with WiFi or 802.11p communications.

* * * * *